United States Patent [19]

Kitamura

[11] Patent Number: 4,629,052

[45] Date of Patent: Dec. 16, 1986

[54] ESCALATOR WARNING SYSTEM

[75] Inventor: Shigeharu Kitamura, Inazawa, Japan

[73] Assignee: Mitsubishi Denki Kabushiki Kaisha, Tokyo, Japan

[21] Appl. No.: 773,920

[22] Filed: Sep. 9, 1985

[30] Foreign Application Priority Data

Jan. 22, 1985 [JP] Japan .................................... 60-9401

[51] Int. Cl.[4] .............................................. B65G 43/00

[52] U.S. Cl. .................................. 198/323; 198/502.1

[58] Field of Search .............................. 198/323, 502.1

[56] References Cited

U.S. PATENT DOCUMENTS 2,846,045 8/1958 Fowler ................................ 198/323

3,913,723 10/1975 Johnson .............................. 198/323

FOREIGN PATENT DOCUMENTS 2829474 1/1980 Fed. Rep. of Germany ...... 198/323

*Primary Examiner*—Joseph E. Valenza

*Assistant Examiner*—Jonathan D. Holmes

*Attorney, Agent, or Firm*—Sughrue, Mion, Zinn, Macpeak and Seas

[57] ABSTRACT

An optical beam (22) is projected across the path of escalator steps (4) and is repeatedly broken by the moving steps to generate a pulse train. When the beam passage is cleared by the steps but remains blocked by a passenger's foot being too close to the riser (6) of the adjacent step, thereby presenting a potential hazard as the steps undergo transition from inclined to horizontal runs, the interruption of the pulse train periodicity triggers a timed warning device, such as a buzzer (24), to alert the passenger. If the foot is not moved to clear the beam path after a short time, the warning intensity may be increased.

7 Claims, 11 Drawing Figures

ESCALATOR WARNING SYSTEM

BACKGROUND OF THE INVENTION

1. Field of the Invention

This invention concerns an arrangement for ensuring the safety of passengers standing on the steps of an escalator.

2. Description of the Prior Art

Escalators generally comprise an endless chain of treads or steps joined successively together. Severe accidents have occurred in which the foot of a passenger is caught between adjacent steps at entry or exit zones where the step chain undergoes transition from an inclined run to a horizontal run, and vice versa. A safeguard for preventing this is shown, for example, in FIG. 4 of Japanese Utility Model Publication No. 147977/1983, which will be explained referring to FIGS. 8 through 11.

These Figures show balustrades 1 disposed opposite each other (only one is visible), skirt plates 2 at the lower portion of the balustrades, an endless step chain 3 driven by means (not shown), steps 4 arranged along the balustrades between the skirt plates 2 and comprising tread plates 5 on which a passenger stands and curved riser plates 6, drive wheels 7, and driven guide wheels 8. The drive wheel shafts (not shown) are joined with the step chain 3. The tread plates 5 have a yellow caution strip 5*a* (FIG. 10) adjacent the riser plate 6 of the next step 4.

The drive wheels 7 are guided along a first rail (not illustrated). The driven wheels 8 ride on and are guided by a lower flanged second rail 9, which curves through the transition zones between the inclined and horizontal runs. An upper flanged float rail 10 is disposed above each second rail 9 at the transition zones. Spaced mounting plates 11A, 11B are secured to the second rail 9, and upper flanged support members 12 are secured to the respective mounting plates. Support brackets 13 are secured at their upper ends to the float rail 10, and abut at their flanged lower ends against the support members 12. Headed pins 14 extend through the abutting flanges of the brackets 13 and the support members 12. Nuts 15 are threaded over the lower ends of the pins, and retaining springs 16 are disposed between the nut washers and the support member 12 flanges. An intermediate bracket 17 is secured at its upper end to the float rail 10, and its flanged lower end engages the plunger of a sensing switch 18 mounted to the plate 11A.

In an ascending operation, the upper surfaces of the tread plates 5 adjacent each other constitute a plane at the lower horizontal entry run, form vertically spaced steps throughout the inclined run, and revert back to a plane at the upper horizontal exit run.

The float rail 10 is downwardly biased by the springs 16, and is normally supported at a predetermined spacing just above the second rail 9 by the abutment of the bracket 13 and support member 12 flanges. Under these conditions the sensing switch 18 contacts are closed by the bracket 17 flange, and the operating circuit for the escalator drive is enabled. When the chain of steps transfers from the inclined run to the upper horizontal run, the contacts of the switch 18 remain closed since the driven wheels 8 move between the confining flanges of the second rail 9 and the float rail 10, unless there is abnormality in the orientation of the steps 4.

However, as shown in FIG. 11, if the toe 19 of a passenger standing on a tread plate 5 is in contact with the riser plate 6 of the next step 4, the toe may become jammed as the vertical spacing between the adjacent tread plates 5 is gradually decreased. In this case, the tread plate on which the passenger stands drags up the next higher tread plate and attendantly raises its driven wheel 8 in the direction of arrow A. Since the float rail 10 is pushed upwardly by this displacement against the force of the springs 16, the bracket 17 also rises to open the switch 18 and disable further operation and movement for the protection of the passenger.

In a descending operation the heel of a passenger may similarly become jammed by contact with the riser plate of the step just behind or above when the chain of steps transfers from the inclined run to the lower horizontal run. An installation similar to that described above is thus provided at the lower transition zone to protect the passengers.

In such a conventional escalator safeguard system, a tread plate may also be lifted due to passenger inattention such as by sticking an umbrella tip into the gap between a tread plate and the next riser or by pushing the rollers of a baby stroller against a riser, thereby stopping the escalator and necessitating operator attention for checking and restarting. Although the yellow caution strips 5*a* on the tread plates are helpful, they are often ignored by passengers.

SUMMARY OF THE INVENTION

This invention has been developed in order to avoid the foregoing escalator stoppages by automatically detecting when the toe or the like of a passenger standing on a tread plate is at a dangerous position, and calling the passenger's attention to such danger before interrupting the operation of the chain of steps. In implementation, an energy beam is projected across the steps and is periodically interrupted or blocked by the moving steps during operation. When the passage of the beam is enabled by the steps but remains blocked by a passenger's toe being too close to the riser of the adjacent step, an alarm device is energized to alert and caution the passenger.

If the passenger does not move his foot to a safe position after a predetermined time, for example one second, the alarm warning may be enhanced or intensified.

DETAILED DESCRIPTION OF THE PREFERRED EMBODIMENT

Figure 1:
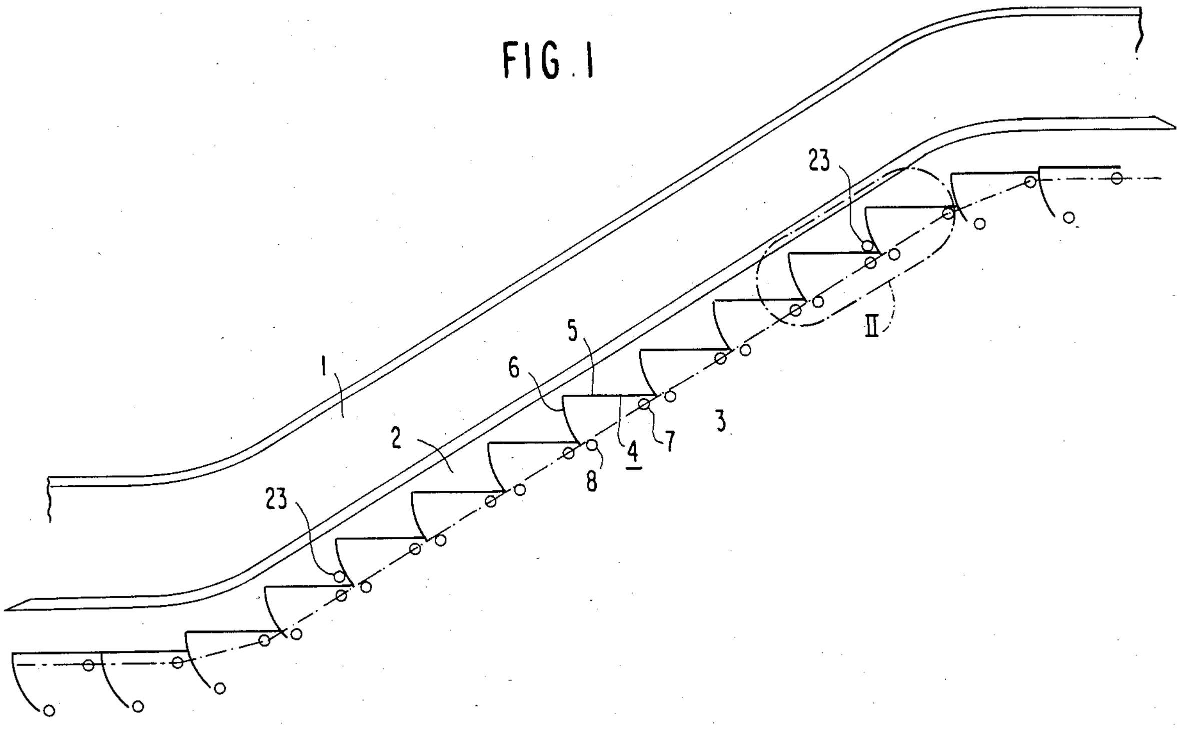
FIG. 1 is a side elevational view in vertical cross-section illustrating one embodiment of an escalator safeguard according to this invention.
Figure 2:
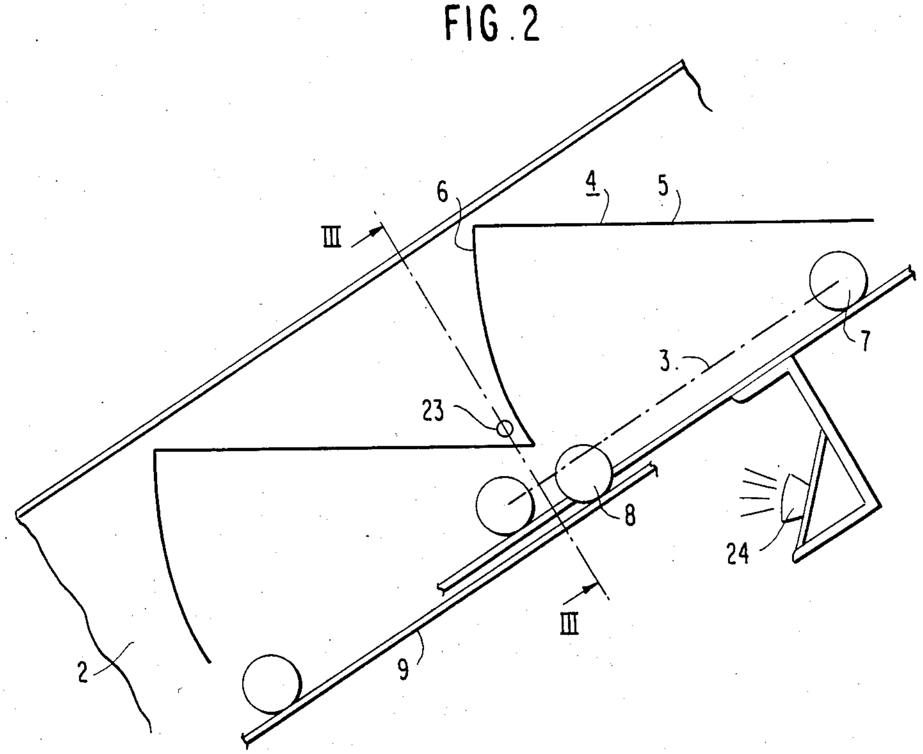
FIG. 2 is an enlarged view of circled portion II in FIG. 1.
Figure 3:
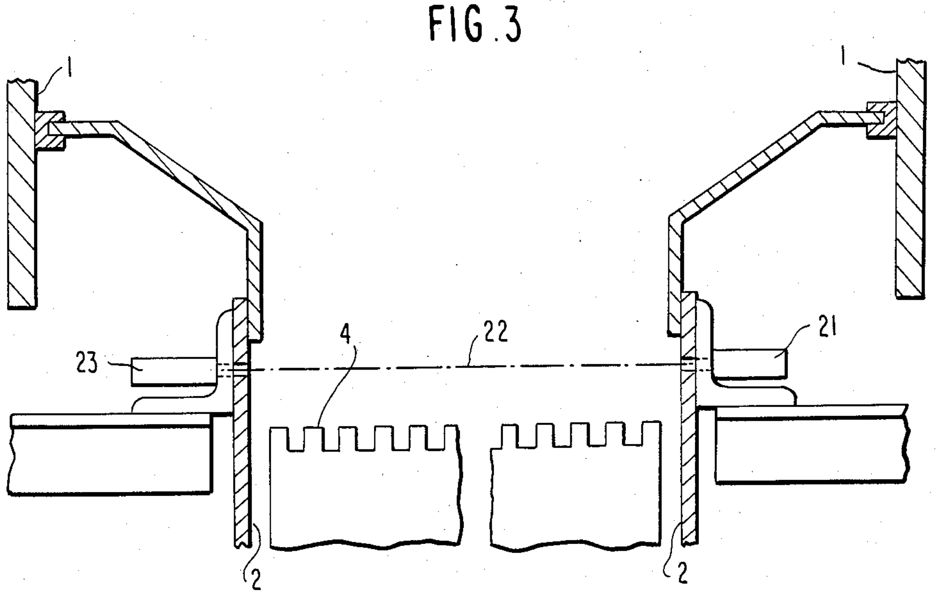
FIG. 3 is a cross-sectional view taken along line III—III in FIG. 2.

FIGS. 1 through 5 show one embodiment according to this invention, wherein elements 1 through 9 are identical with those in the conventional system described above.

In these Figures optical beam projectors 21 are disposed on the skirt plate 2 just above and below the respective lower and upper transition zones, and project beams 22 across the steps 4 in the vicinity of apices of triangles formed between the tread plates 5 and the adjacent riser plates 6. Detection devices 23 are disposed on the skirt plate 2 opposite the projectors 21, and generate an output upon receiving an optical beam 22. An alarm device 24, such as a buzzer, is disposed near each detection device 23.

Figure 4:
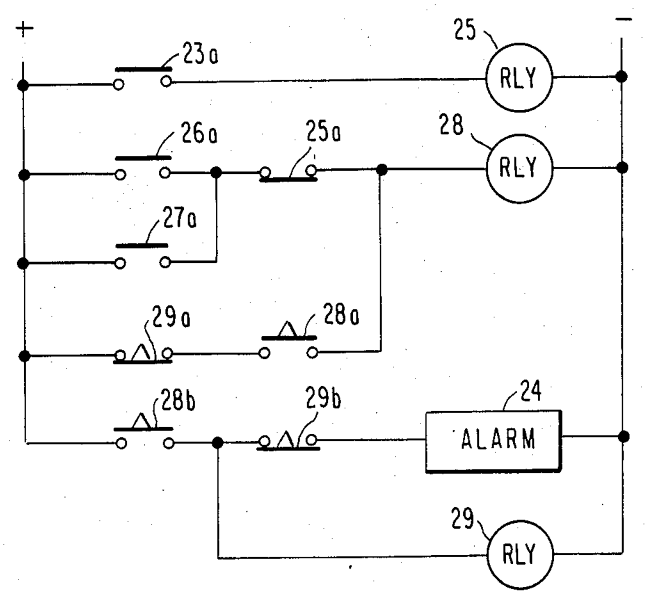
FIG. 4 is a circuit diagram, FIGS. 5(*a*) and 5(*b*) are timing diagrams.

FIG. 4 shows DC power lines (+) and (−), a contact 23*a* for a detection device 23 which is closed when the optical beam 22 is being received and opened upon interruption of the beam, a step detection relay 25, a normally closed contact 25*a* therefor, an ascending relay contact 26*a* which is closed upon ascending operation of the chain of steps, a descending relay contact 27*a* which is closed upon descending operation, a timer relay 28 which operates after a certain delay period (for instance one sec.) upon energization, normally open contacts 28*a*, 28*b* therefor, a timer relay 29 similar to the timer relay 28 but set, for example, to 5 sec., and normally closed contacts 29*a*, 29*b* for the timer relay 29.

Figure 5:
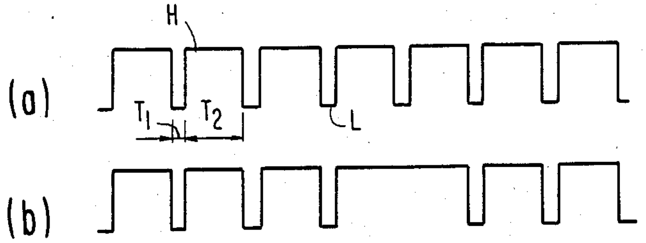

During normal operation, since the beam 22 is repeatedly interrupted by the passage of the steps 4, the detection device 23 outputs a pulse train comprising inverted or low levels "L" for beam passage and high levels "H" for beam interruption as shown in FIG. 5(*a*) ($T_1$:beam passage time, $T_2$:beam interruption time). Thus, contact 23*a* is closed during the passage of the beam and opened during the interruption of the beam. Since the step detection relay 25 is repeatedly energized and deenergized accompanying the operation of contact 23*a* contact 25*a* is correspondingly actuated such that it is open during beam passage and closed during beam interruption.

In the case of an ascending operation, relay contact 26*a* is closed. When the optical beam 22 is interrupted by a step 4 and contact 25*a* is closed, the timer relay 28 is energized and starts to count or run its delay time, which is set somewhat longer than the time required for one step 4 to pass through the beam 22. When the escalator is operated at a speed of 30 m/min., for example, such delay time is set at one second as described above. If the beam 22 is allowed to pass again before one second has elapsed, contact 25*a* is reopened and the timer relay 28 is deenergized before its time delay has expired; its contacts 28*a*, 28*b* thus remain open. This operation is repeated so long as only the steps 4 periodically block the beam 22.

If a passenger's toe or the roller of a baby carriage is situated near the riser plate 6 of the adjacent step 4, however, to thereby inhibit or block the beam 22 from passage, contact 25*a* does not open and the timer relay 28 is actuated after one second and latched by the closure of its contact 28*a*. See the pulse train of FIG. 5(*b*). Contact 28*b* is simultaneously closed to sound the alarm buzzer 24 and warn the passenger. The closure of contact 28*b* also energizes the timer relay 29, and after its delay of 5 seconds has run the contacts 29*a*, 29*b* are opened. This resets the timer relay 28, stops the sounding of the buzzer 24, and by reason of contact 28*b* opening, resets the timer relay 29.

The foregoing explanation similarly applies to a descending operation.

Thus, the beam 22 is directed across the steps at the "danger" apex between the tread and riser plates 5, 6 of the escalator. If the regularly interrupted pulse pattern of FIG. 5(*a*) is broken as in FIG. 5(*b*), an alarm is sounded to alert the passenger to the dangerous position of his toe or the like so that he may move it back before it becomes jammed and the escalator is halted by the arrangement of FIGS. 8–11.

Figure 6:
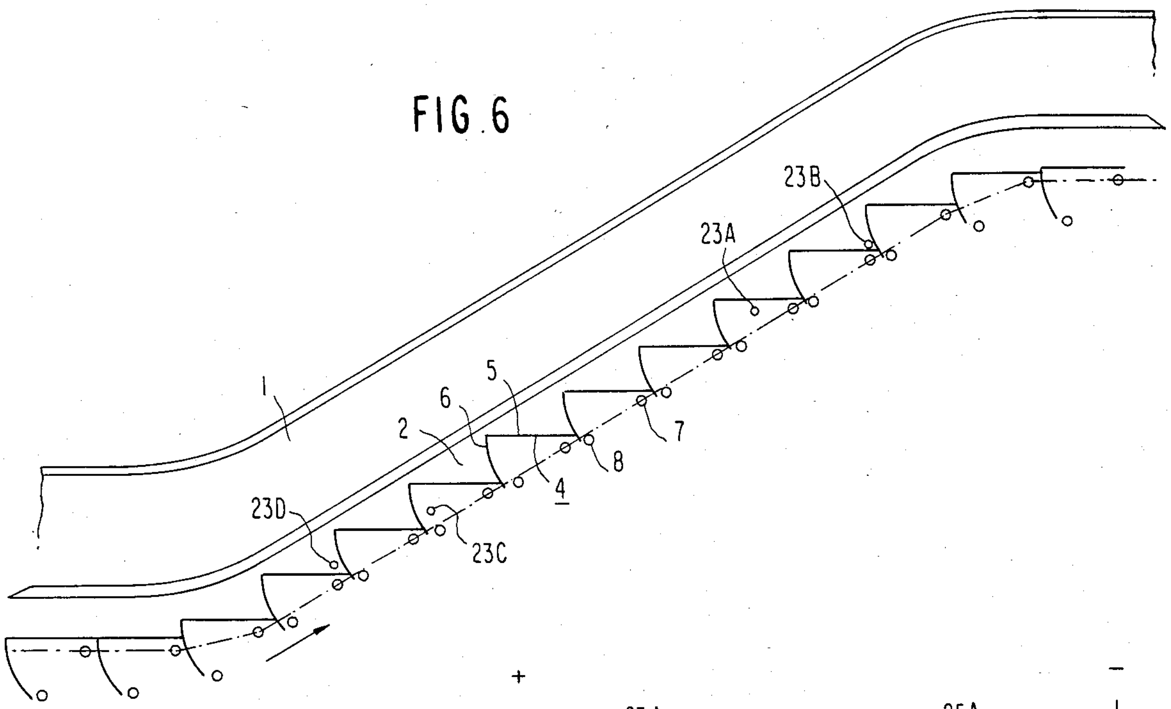
FIG. 6 is a side elevational view in vertical cross-section of another embodiment of this invention.
Figure 7:
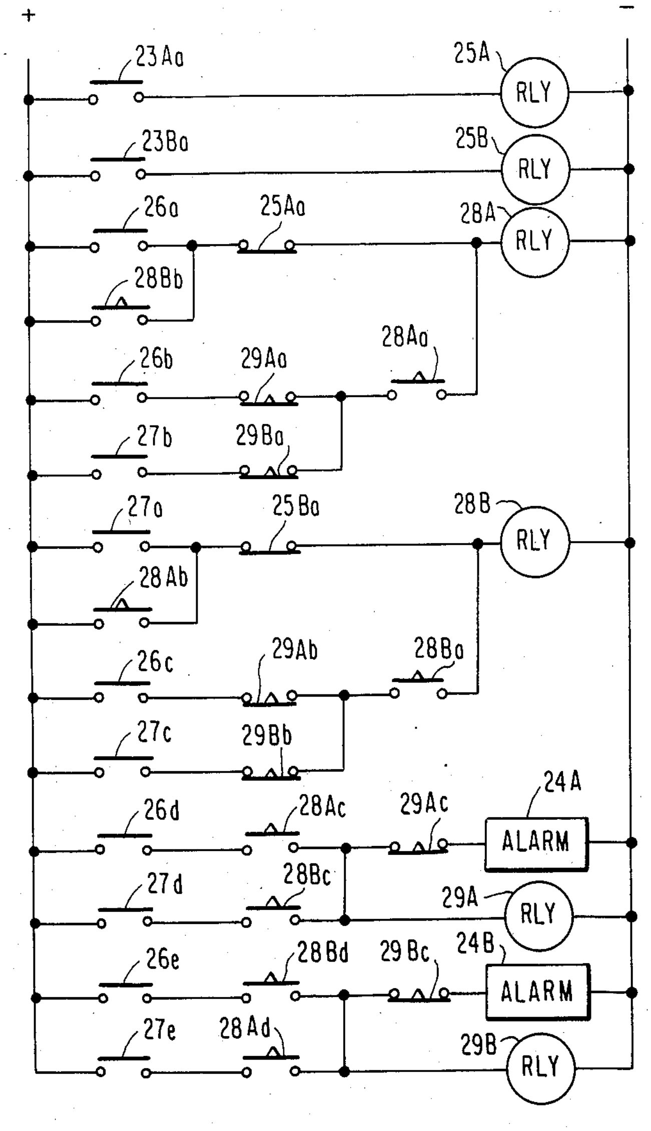
FIG. 7 is a circuit diagram.
Figure 8:
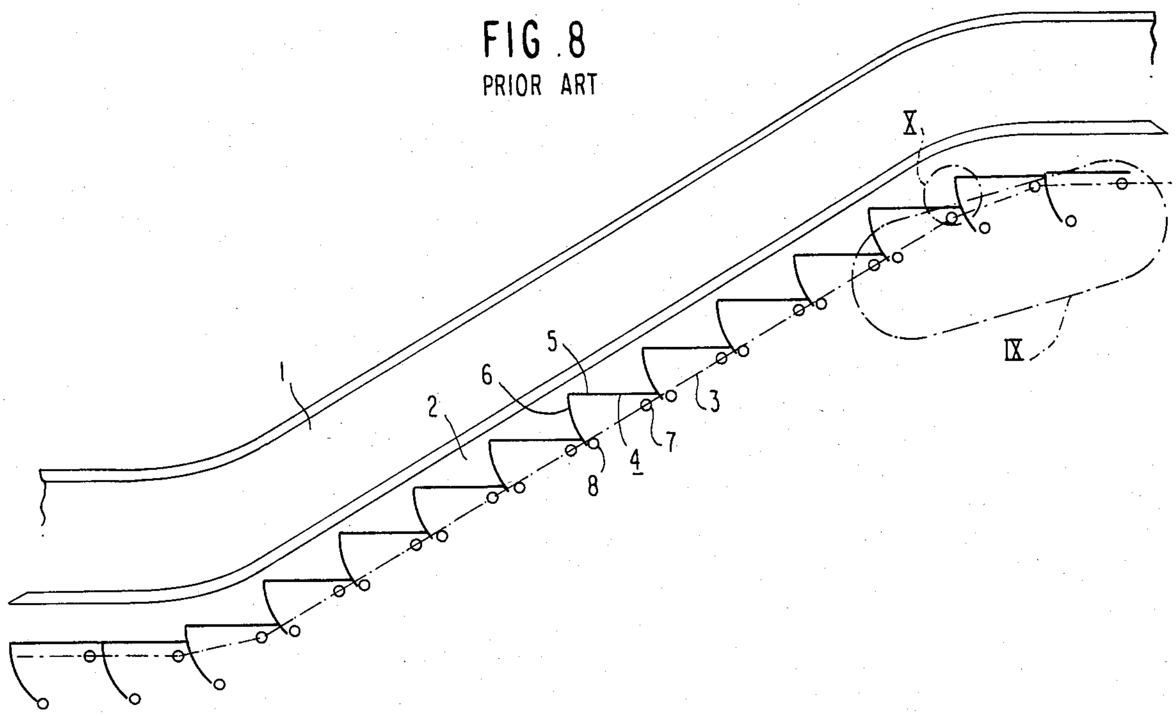
FIG. 8 PRIOR ART
FIG. 8 is a side elevational view in vertical cross-section of a conventional safeguard system for an escalator.
Figure 9:
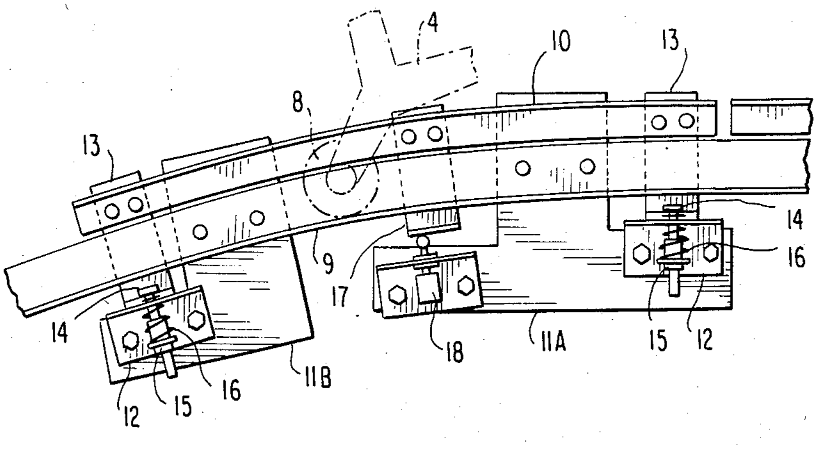
FIG. 9 PRIOR ART
FIG. 9 is a detailed view of circled portion IX in FIG. 8.
Figure 10:
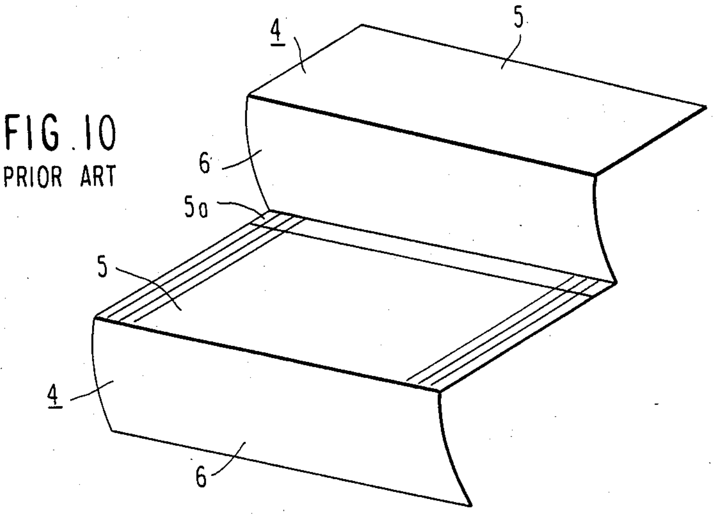
FIG. 10 PRIOR ART
FIG. 10 is a perspective view of circled portion X in FIG. 8.
Figure 11:
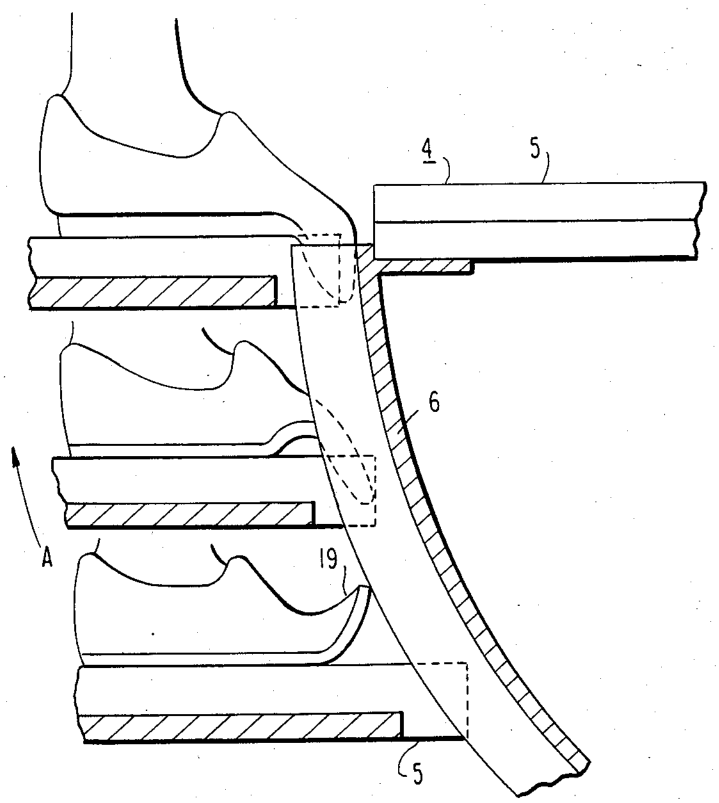
FIG. 11 PRIOR ART
FIG. 11 is a sectional view illustrating a jammed passenger toe.

FIGS. 6 and 7 show another embodiment of the invention, wherein spaced detection devices 23A, 23B are disposed just below the upper transition zone and similarly spaced detection devices 23C, 23D are disposed just above the lower transition zone.

The circuit of FIG. 7 includes normally closed contacts 23A*a*, 23B*a* respectively for the detection devices 23A, 23B, buzzers 24A, 24B respectively corresponding to the detection devices 23A, 23B, step detection relays 25A, 25B, normally closed contacts 25A*a*, 25B*a* therefor, ascending relay contacts 26*a*–26*e*, descending relay contacts 27*a*–27*e*, one second timer relays 28A, 28B, normally open contacts 28A*a*–28A*d* and 28B*a*–28B*d* therefor, five second timer relays 29A, 29B, and normally closed contacts 29A*a*–29A*c* and 29B*a*–29B*c* therefor.

When the ascending operation contacts 26*a*–26*e* are closed, the timer relay 28A is energized through the circuit: (+)-26*a*—25A*a*—28A—(−), and starts to run its one second delay time. If the optical beam 22 is passed again before the elapse of one second after its interruption by a step 4, contact 25A*a* is opened and the timer relay 28A is reset in the same manner as in FIG. 4.

If the beam 22 is inhibited or blocked from passage, however, as by a passenger's toe, the timer relay 28A operates and latches by the closure of its contact 28A*a*. Since contact 28A*c* is also closed, the buzzer 24A is sounded through the circuit: (+)—26*d*—28A*c*—29A*c*—24A—(−). Further, since contact 28A*b* is closed, if the beam is still interrupted and contact 25B*a* for the next step detection relay 25B does not open, the timer relay 28B starts to run its delay time. After one second has elapsed relay 28B is actuated and latched by the closure of its contact 28B*a*, and contact 28B*d* is also closed. Buzzer 24B is thus sounded through the circuit: (+)—26*e*—28B*d*—29B*c*—24B—(−), to thereby issue an intensified warning in conjunction with the still energized buzzer 24A. After the elapse of five seconds from the sounding of buzzer 24A, timer relay 29A opens its contacts 29A*a*–29A*c* to reset the timer relays 28A, 28B and deenergize both of the buzzers 24A, 24B.

The five second timer relay 29B functions in a similar manner during a descending operation, for which the contacts 27*a*–27*e* would be closed.

The foregoing explanation similarly applies to a descending operation, for which a circuit similar to that of FIG. 7 would be provided for the lower zone detection devices 23C, 23D.

Although optical beams 22 are used in each of the foregoing embodiments, supersonic beams or laser beams can also be utilized.

Further, although buzzers are used as the alarm devices, yellow caution lights could be used in addition or as an alternative, either flickering or revolving. Audio warnings such as "danger" or "do not cross the yellow line" could also be employed.

What is claimed is:

1. In a passenger escalator system including a driven chain (3) of steps (4) traversing a path including an inclined run flanked by upper and lower horizontal runs, each step including a horizontally maintained tread plate (5) and a generally vertically oriented riser plate (6) depending downwardly from a front edge thereof and slidable relative to a rear edge of a next adjacent tread plate as the chain of steps passes through transition zones between inclined and horizontal runs, means for alerting a passenger to a potentially hazardous disposition of a foot or passenger borne object too close to a riser plate, comprising:

(a) means (21) fixedly disposed at one side of the inclined run of the chain of steps for projecting an energy beam (22) transversely across the chain of steps, said projecting means being positioned such that the beam is repeatedly blocked by the moving steps, and when unblocked extends through a danger zone proximate apices of tread plate rear edges and adjacent riser plate lower edges, (b) means (23) fixedly disposed at another, opposite side of the chain of steps for detecting the energy beam and generating a regular periodic pulse train in response to the blocking and unblocking of the beam by the moving steps, (c) circuit means responsive to the pulse train for sensing a discontinuity in the periodicity thereof, and (d) alarm means (24) responsive to the circuit means for alerting the passenger.

2. A system according to claim 1, wherein the alarm means is disposed proximate the detecting means.

3. A system according to claim 2, wherein the projecting means and the detecting means are disposed just upstream from a nearest transition zone in the direction of movement of the chain of steps.

4. A system according to claim 3, wherein the energy beam is an optical beam.

5. A system according to claim 3, further comprising an additional projecting means and an associated additional detecting means disposed downstream of said first recited projecting means and detecting means, additional circuit means responsive to a pulse train generated by the additional detecting means for sensing a discontinuity in the periodicity thereof, and means responsive to the additional circuit means for intensifying an output of the alarm means to enhance the passenger alert if a foot or other object disposed in a danger zone has not been moved to a safe position.

6. A system according to claim 5, wherein the intensifying means comprises an additional alarm means (24B).

7. A system according to claim 3, wherein the circuit means comprises:

(a) a first delayed actuation relay (28) for energizing the alarm means unless reset before the elapse of a delay time thereof exceeding the period of the pulse train, (b) a second relay (25) responsive to the pulse train for repeatedly resetting the first relay, and (c) a third delayed actuation relay (29) for deenergizing the alarm means after a predetermined delay time.

* * * * *